United States Patent [19]

Fuss

[11] 4,147,392
[45] Apr. 3, 1979

[54] VEHICULAR TRANSPORT AND CONVEYANCE SYSTEM

[75] Inventor: Gunter G. Fuss, San Carlos, Calif.

[73] Assignee: Free-Flow Packaging Corporation, Redwood City, Calif.

[21] Appl. No.: 811,973

[22] Filed: Jun. 30, 1977

[51] Int. Cl.² ............................................. B65G 53/40
[52] U.S. Cl. ........................................ 302/52; 302/57
[58] Field of Search ...................... 302/29, 31, 52, 53, 302/25, 45, 47, 57; 214/83.28

[56] References Cited

U.S. PATENT DOCUMENTS

| 957,126 | 5/1910 | Tilley | 302/52 |
|---|---|---|---|
| 2,715,549 | 8/1955 | Shields | 302/52 |
| 2,805,896 | 9/1957 | Yellott | 302/29 |
| 2,956,839 | 10/1960 | Hermanns | 302/53 |
| 3,393,943 | 7/1968 | Kelly | 302/53 |
| 3,708,208 | 1/1973 | Fuss | 302/28 |

FOREIGN PATENT DOCUMENTS 765158  1/1957  United Kingdom ...................... 302/29

*Primary Examiner*—Robert B. Reeves
*Assistant Examiner*—Jeffrey V. Nase
*Attorney, Agent, or Firm*—Flehr, Hohbach, Test, Albritton & Herbert

[57] ABSTRACT

A system (method and apparatus) for combined vehicular transport and pneumatic conveyance of lightweight subdivided materials. The system generally operates to convey a supply of subdivided material (e.g., cushioning and packaging material) from a source of supply of such material to a point in a particular customer operation (e.g., packaging of products). The system is particularly adapted to truck transport wherein a flexible air blanket on the bottom of the truck functions to pneumatically convey subdivided material from within to the rear of the truck, from which point it is pneumatically conveyed to an in-plant conveyance system. The system additionally employs cooperating pneumatic conveying means within the plant to receive the subdivided materials from the truck and to rapidly deliver the same to bulk storage containers, from which it can be selectively and rapidly conveyed to preselected individual distribution outlets. The system is specifically characterized by a progressive discharge of subdivided material from the truck body through substantially unidirectional operation of the air blanket, and by a related unidirectional discharge of the bulk storage containers within the plant, thus facilitating rapid and efficient unloading of light weight subdivided materials from bulk transport to in-plant distribution operations.

4 Claims, 10 Drawing Figures

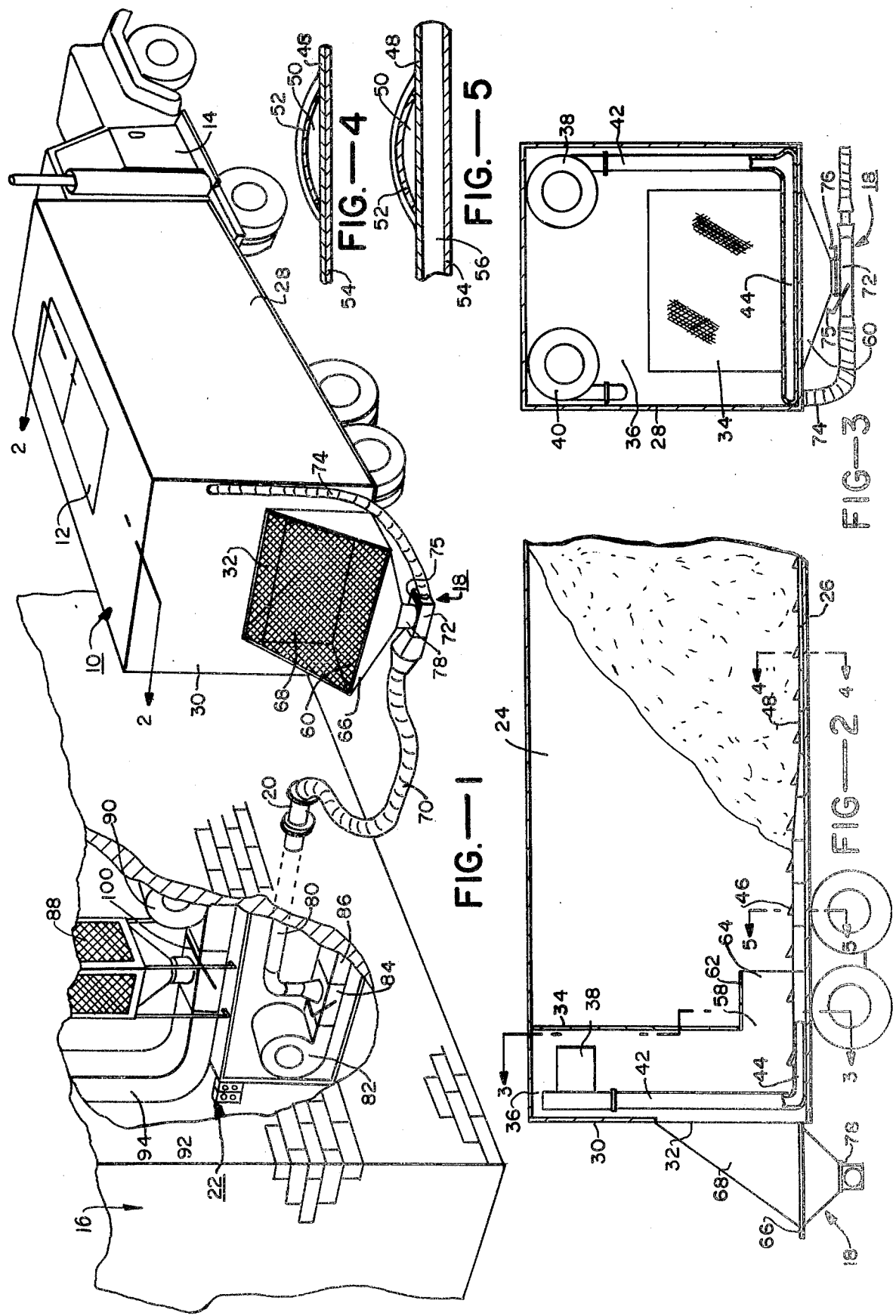

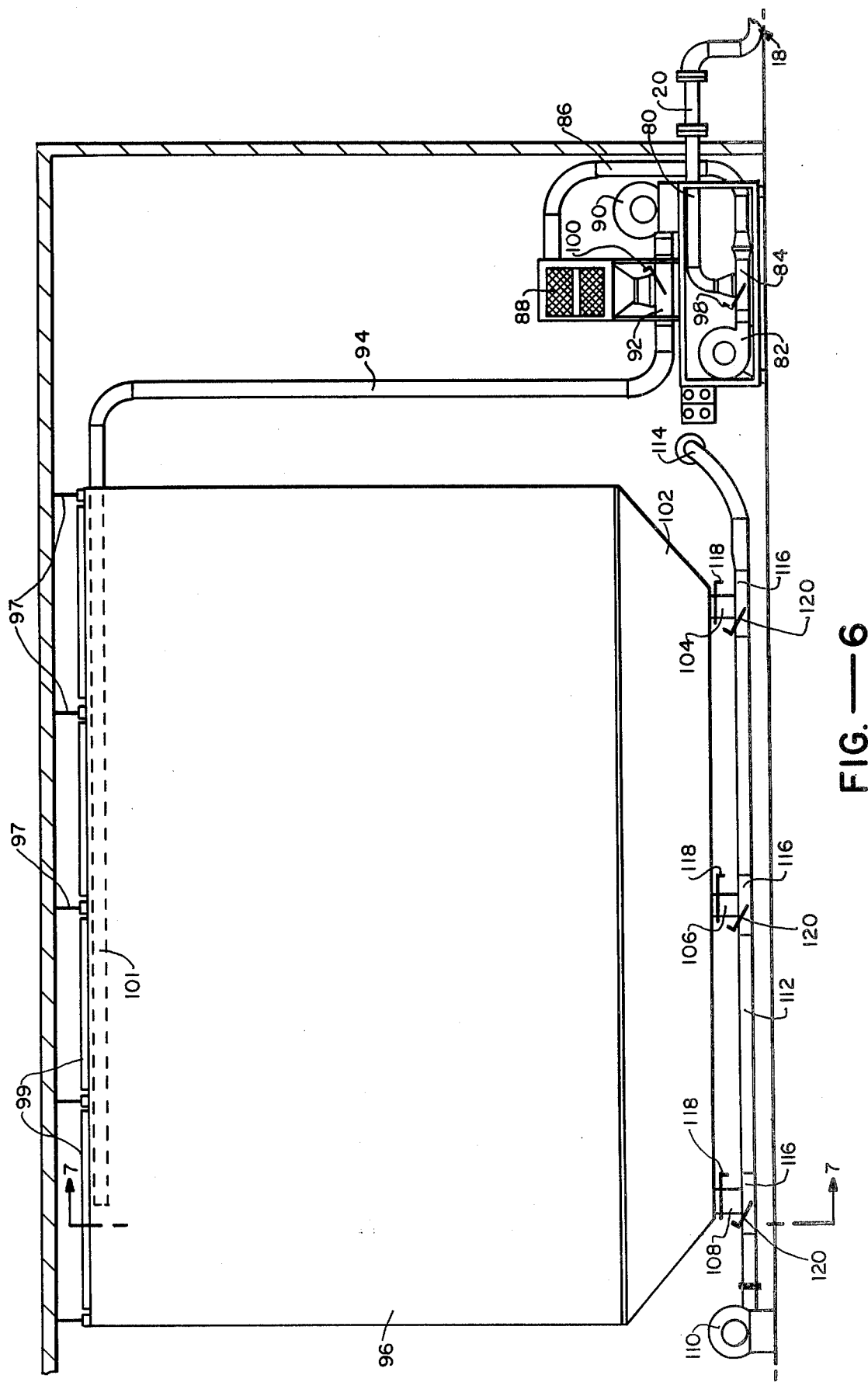

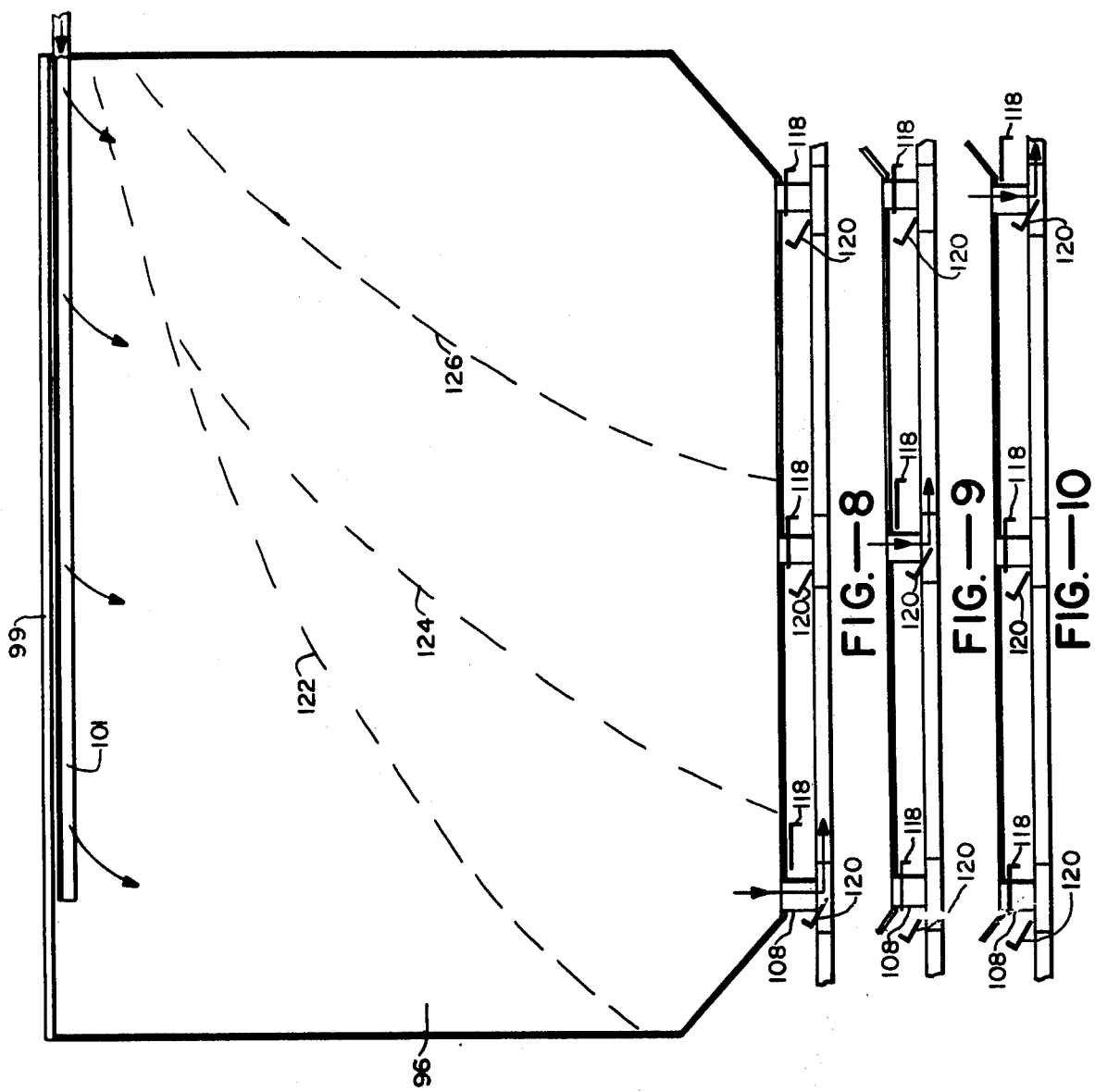
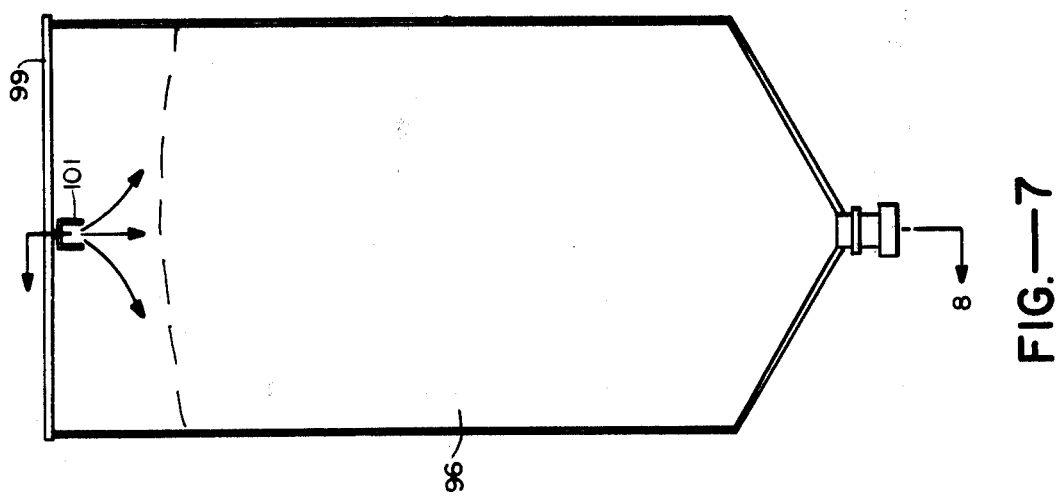

VEHICULAR TRANSPORT AND CONVEYANCE SYSTEM

BACKGROUND OF THE INVENTION

This invention relates generally to systems for vehicular transport and pneumatic conveyance of lightweight subdivided materials from a source of supply to a distant point of use and more particularly relates to methods and means making possible the rapid discharge of bulk quantities of subdivided light weight materials from truck transport to in-plant storage and subsequent delivery and use in cushioning and packaging operations.

The present invention has particular application to the combined vehicular and pneumatic conveyance of free-flowing cushioning and packaging materials of the type disclosed for example in U.S. Pat. Nos. 3,074,543, 3,400,037, and 3,481,455, for in-plant delivery and use of such materials by selective distribution systems as disclosed, for example, in U.S. Pat. Nos. 3,708,208 and 3,762,772. Although characterized by desired free-flowing characteristics, such cushioning and packaging materials are very light in weight and are not easily conveyed because of their very low bulk density (of the order of 0.3 to 0.6 pounds per cubic foot). Satisfactory movement or conveyance of such materials is therefore not readily obtained by conventional means such as endless conveyors and the like. The extreme light weight of such materials also presents problems in conjunction with conventional gas conveyance systems due to a susceptibility to channeling or "blow through" in the presence of compressed air or other gas used as the conveyance medium. A further particular problem is presented by the difficulty encountered in discharging bulk quantities of such light weight materials from large truck-trailer transports, of from large in-plant storage facilities of the type customarily used with such materials.

SUMMARY OF INVENTION AND OBJECTS

Generally stated, the present invention is directed to a system (method and means) for the vehicular transport and pneumatic conveyance of lightweight subdivided materials from a source of supply, for example, a manufacturing plant to a point of end use, for example, a packaging facility.

Broadly, the system of the present invention makes use of vehicular transport wherein a relatively large volume enclosed transport body is substantially filled with the lightweight subdivided material, and the transport body is provided with pneumatic conveyance means for progressively and rapidly discharging the entire contents of the transport body through discharge conveyance means. The discharge conveyance means is adapted to communicate with similar in-plant pneumatic conveyance means which transports the lightweight subdivided material to large bulk storage containers. These large bulk storage containers are similarly provided with means to progressively discharge the entire contents to remote preselected distribution outlets where the light weight subdivided material can be used for the intended purpose, for example, in packaging and cushioning operations or, in the case of lightweight subdivided products such as dry cereals, for self packing operations.

Apparatus particularly adapted to use in the present invention includes a vehicular transport body (e.g., truck trailer) equipped with cooperating air conveyance means for quickly emptying the contents of the truck body. More specifically, flexible air blanket means is positioned on the bottom of the truck body so as to extend from a forward or inner end thereof to a rear or outer end, and is provided with directional discharge means on an upper surface. Upon receiving air from a blower means, the air blanket inflates progressively in a forward direction as respects the truck body whereas the directional discharge means operate to progressively discharge subdivided material towards the rear of the truck, such operation continuing until the entire truck load has been progressively discharged. At the rear of the truck body the material is received in cooperating discharge hopper means which operates in conjunction with a discharge blower system. The latter includes a venturi positioned immediately adjacent a bottom outlet of the hopper so that the lightweight material is drawn into the hopper and into a discharge conduit for delivery to cooperating in-plant conveyance means. The in-plant conveyance system similarly employs blower means together with associated hopper and venturi means to transport the subdivided material to one or more large perforate storage containers adapted to bulk storage of the lightweight subdivided material. More specifically, the storage containers can be in the form of large mesh bags within which are positioned inverted "U-shaped" ducts which facilitate uniform delivery and distribution of the subdivided material within the bags. At a lower region, the storage bags are provided with a plurality of slide valve discharge outlets which operate in conjunction with associated venturi means to progressively discharge into a distribution and conveyance line. As will appear, selective operation of the separate discharge outlets enables the contents of the storage containers to be rapidly and effectively transported for use in remote plant operations.

The method of the present invention is particularly adaptable to operations wherein it is desirable to transport large quantities of lightweight subdivided material from manufacturing plant to consuming plant and wherein it is desired that the subdivided material be rapidly and effectively discharged from truck transport into plant conveyance systems for selective distribution and use of the material in packaging and/or filling operations.

In general, therefore, one object of the present invention is to improve upon systems for such purpose particularly with regard to improved vehicular transport methods and means by which rapid effective delivery and discharge of bulk quantities of lightweight materials from vehicular transport to one or more plant reception and distribution facilities can be accomplished within a very short period of time.

Another object of the invention is to provide a system of apparatus of such character which enables progressive discharge of the entire contents of a vehicular transport body without tendency towards loss, channeling or blow through of the conveyance gases such as would render the system inoperative.

A further object of the invention is to provide an improved system of apparatus of such character making use of pneumatic conveyance means on vehicular transport in cooperation with in-plant pneumatic conveyance and distribution systems.

A still further object of the invention is to provide an improved system of apparatus of such character whereby the entire contents of a vehicular transport body can be rapidly and progressively discharged, simultaneously received within large in-plant storage containers, and thereafter rapidly and progressively discharged from such containers for use in operations at one or more preselected distribution outlets.

A still further object of the invention is to provide an improved method for cooperative vehicular and pneumatic conveyance of light weight materials in systems of the type described, to accomplish the desired result.

Additional objects and features of the invention will appear from the following detailed description of the same and from the drawings.

BRIEF DESCRIPTION OF THE DRAWINGS

FIG. 1 is a view in perspective of a vehicular transport and pneumatic conveyance system according to the present invention.

FIG. 2 is an enlarged fragmentary view in section, along the line 2—2 of FIG. 1.

FIG. 3 is a like view along the line 3—3 of FIG. 2.

FIGS. 4 and 5 are greatly enlarged detailed views along the lines 4—4 and 5—5, respectively, of FIG. 2.

FIG. 6 is a view in section and elevation of another portion of the apparatus of FIG. 1, illustrating further features thereof.

FIG. 7 is a view in section along the line 7—7 of FIG. 6.

FIG. 8 is a view in section along the line 8—8 of FIG. 7.

FIGS. 9 and 10 are fragmentary sequential views, similar to FIG. 8, illustrating different stages of operation.

DETAILED DESCRIPTION OF THE PREFERRED EMBODIMENTS

Referring to the drawings, FIG. 1 illustrates a particular system of apparatus in accordance with the present invention. As noted above, the apparatus is particularly useful in the conveyance, delivery, storage and selective distribution of large volumes of lightweight cushioning and packaging materials (e.g., foamed expanded polystyrene and similar lightweight plastic materials) for use in a wide variety of packaging and filling operations.

Assuming a plant distribution operation requiring large volumes of lightweight cushioning and packaging materials of the type described, bulk quantities of the subdivided material are introduced into the truck body 10 through a suitable access opening 12. It will be understood that this initial filling operation is carried out at the manufacturing plant or other supply source by relatively large scale equipment appropriate to the task. Although illustrated as a truck trailer, the transport body 10 could be any form of vehicular transport such as a rail car, sled, or barge. Assuming use of a truck trailer, the contents of the transport body 10 are moved by the truck 14 to the point of delivery which may be a customer's plant 16. There, the contents of the truck are delivered through the truck discharge system (generally represented at 18) through a suitable connection 20 to the stationary plant conveyance system (generally represented at 22).

With particular reference to FIGS. 1-3, the truck body is seen to comprise top and bottom walls 24 and 26, side walls 28 and a rear or end wall 30. As illustrated, the end wall 30 is provided with a relatively large opening 32 for a purpose which will hereafter be described. Spaced inwardly of the end wall is a vertical separation wall 34 which forms a rear compartment 36 within which is positioned first blower means 38 for the air blanket and second blower means 40 for the discharge conveyance system 18. In general, the blower means 38 functions to discharge a relatively high volume of air at a relatively low pressure through conduit means 42 leading to a manifold 44 extending transversely across the rear of the truck body. At its forward end, the manifold 44 interconnects in gas-tight relation with the rear opening of an elongated flexible substantially gas-tight blanket means 46, which is dimensioned to be generally coincident with the bottom surface 26 of the truck body. In its inoperative or collapsed state, the air blanket 46 is a relatively flat envelope which extends across the bottom of the truck and upon which the load of subdivided material rests during the transport stage of the operation. As particularly illustrated in FIGS. 2 and 4, the upper surface 48 of the air blanket is provided with transverse slit openings 50 into which relatively stiff air scoops or guide members 52 can be inserted. The scoops 52 generally function to direct air discharged through the slits 50 in a rearward direction as respects the truck body 10, and may be formed of any suitable material such as hard plastic or metal. More specifically, upon operating the blower 38, air will pass into the air blanket 46 causing the air blanket to expand so that air passes out of the slit openings 50 beneath the scoop members 52. Such condition of the air blanket is illustrated in FIG. 5 where the upper surface 48 is held in spaced relation above the lower surface 54 of the air blanket by the air pressure within the interior space 56. During the operation to discharge the contents of the truck body, rearward portions of the air blanket 46 are initially expanded with adjacent portions of the air blanket being progressively expanded in a forward direction. As a consequence, subdivided material to the rear of the truck is discharged first, with material toward the front of the truck being progressively discharged until the entire truck is empty. To facilitate this emptying operation, an opening 58 is provided beneath the inner partition 34, permitting the material discharged from the interior of the truck to pass through the rear opening 32 into a discharge hopper 60 positioned adjacent the rear of the truck. If desired, discharge baffle means 62 of flexible screening or like material supported by any appropriate means 64, may be employed to prevent bridging of the subdivided material across the discharge openings 58 and 32.

As best illustrated in FIGS. 1 and 2, the truck discharge hopper 60 is suitably supported adjacent the rear of the truck by platform means 66, which can also function as a suitable means for anchoring and supporting screening means 68 across the rear discharge opening 32. The screening means 68, which may be of any suitable material such as nylon mesh, expanded metal or the like, functions as a means to dissipate the air pressure from the blower 38 while preventing any loss of the lightweight subdivided material. To facilitate this function, the screening means 68 is anchored about all three sides of the extended platform 66 and the side and upper boundaries of the opening 32, to provide an enclosure linking the discharge opening 32 with the discharge hopper 60.

As best shown in FIGS. 1 and 3, the discharge hopper 60 forms part of the truck discharge system 18, which also includes a discharge conduit 70, a venturi 72 positioned immediately adjacent the bottom outlet for the hopper and a blower conduit 74 interconnecting the and retraction of the closure slide 76. The truck mounted blower 38 can now be activated to initiate inflation of the air blanket 46 and the progressive discharge operations previously described. More specifically, air introduced through the manifold 44 passes into the air blanket 46 to cause expansion of the same and to effect a rearward discharge movement of air through the transverse slits 50 and directional scoops 52. Such movement of air causes subdivided material to be rapidly impelled toward the discharge opening 32 in the rear of the truck. From there, the subdivided material is sucked into the hopper 60, loss of material being prevented by the screening means 68. Continued operation of the blower 38 effects progressive inflation of the air blanket 46 in a forward direction with the result that the material is first discharged from the rear of the truck and then progressively from interior regions of the truck until the subdivided material at the innermost or forward end of the truck body has been fully discharged.

Throughout the foregoing discharge operations, subdivided material is rapidly and effectively sucked into the inlet conduits 80 and 84 of the plant conveyance system through concurrent operation of the blower-venturi systems of the truck discharge system 18 and the plant conveyance system 22. More specifically, operation of the blower 82 and its associated venturi 84 enables the subdivided material in the truck to be sucked first into the line 80, and then to be pushed through the line 86 to the cage 88. Operation of the blower 90 and its associated venturi 92 allows material falling from the cage 88 to be pushed through the supply line 94 to the storage bag 96. Throughout this operation, the described functions of blower-venturi units 82, 84 and 90, 92 can be controlled by the positioning of the respective venturi slides 98 and 100. It may be appreciated however that, once established, the positions of these venturi slides most likely will remain stationary.

Delivery of subdivided materials from the supply conduit 94 (as received from the truck 10) is effected through the U-shaped duct 101 so that material is distributed uniformly across the length of the storage bag 96, conveyance air being simultaneously dissipated through the open mesh construction of the bag. In view of the large size of the storage bags 96, such procedure permits relatively large or "bulk" quantities of the subdivided materials to be rapidly collected and concentrated within one or more of the storage bags, depending upon the size and nature of the plant packaging operations being carried out. When needed for in-plant packaging and filling operations, the contents of a storage bag 96 can be progressively discharged by means of the flex-hose discharge outlets 104–108 and their associated shut-off slide valves 118 and venturi slide valves 120. Thus, the discharge operation at a particular flex-hose outlet is effected by retracting the slide valve 118 and inserting the venturi slide 120. Typically, in a first discharge stage, the flex-hose outlet 108 is opened to effect discharge whereas the flex-hose outlets 106 and 104 are closed (see FIG. 8). In succeeding discharge stages the flex-hose outlet 106 is opened and the flex-hose outlets 104 and 108 closed; following which the flex-hose outlet 104 is opened and the outlets 106 and 108 closed. In each instance, the rate of discharge through a particular discharge opening is regulated by the degree of insertion of a particular venturi slide 120, faster discharge flow rates being represented by a greater degree of insertion of the venturi slide.

In general, and assuming a truck volume of about 3,600 cubic feet and a discharge rate of 0.5 to 1.0 cubic feet per second, the entire operation of discharging a transport vehicle 10 and receiving and storaging subdivided material within a storage bag 96 can be accomplished in a very short period of time, say, 1 to 2 hours. In like fashion, the discharge of bulk quantities of lightweight subdivided material from the storage bags 96 to various desired points of use, can be accomplished with equal speed and facility. By way of illustration, distribution and use of various types of cushioning and packaging materials can be effected through coupling the distribution conduit 114 with localized distribution systems of the type described and illustrated, for example, in the aforementioned U.S. Pat. Nos. 3,708,208 and 3,762,772.

From the foregoing, it will be apparent that a system for vehicular transport and pneumatic conveyance according to the present invention makes possible the rapid and effective transport of such materials from a manufacturing source to a particular point of end use. The described vehicular air blanket system, operating in conjunction with in-house pnuematic conveyor systems of the type described, enables truck transport means to be conveniently employed for both transport and pneumatic conveyance. The system effectively uses air pressure generated in the truck transport to entirely discharge the contents thereof while permitting immediate and effective collection and storage of the discharged material in bulk storage containers. The system further enables such storage containers to be rapidly and progressively emptied of their contents in response to periodic and remote localized demand. The utility of the concepts of the present invention in the rapid transport and selected discharge and conveyance of lightweight materials in subdivided form is therefore readily apparent.

It will be further understood that many variations are possible in the method and apparatus described, without departing from the scope of the invention. To illustrate, the in-plant conveyance system might be partially eliminated by a direct connection between the truck discharge system 18 and the supply conduit 94 for the bulk storage containers 96. In like fashion, customer blower units might be employed to operate either the air blanket system within the truck conveyance unit or the truck hopper discharge unit. Although not as effective as the combination system described, some of the benefits of the present invention might thereby be obtained. To those skilled in the art to which this invention pertaining, the foregoing and other similar variations of the invention will be readily understood, the disclosure herein being intended as purely illustrative of the subject matter defined by the appended claims.

What is claimed is:

1. In a system for pneumatic conveyance of lightweight subdivided materials from a source of supply to a point of end use, said system being adapted for use with vehicular means having a discharge conduit for discharge of lightweight subdivided materials, the combination of stationary conveyance means for lightweight subdivided materials including a relatively large volume storage container for said lightweight subdivided material, said storage container being in the form of a large flexible perforated bag having an inverted U-shaped duct means positioned adjacent the top thereof, supply conduit means adapted to interconnect in fluid communication with the discharge conduit blower 40 with the venturi. In general, the blower 40 operates to discharge a relatively low volume of high pressure air through the venturi to withdraw subdivided material from the rear of the truck for delivery through the discharge conveyance conduit 70. To provide control over the discharge operation, a manually operable slide valve 75 is positioned within the venturi 72 and is operable in conjunction with a similar slide valve or closure plate 76 positioned in the hopper outlet. In its simplest form, the venturi slide valve 75 consists of rigid plate means insertable in a diagonal slot in the walls of the venturi. The slide valve or closure 76 can likewise be formed to slide in guide members forming part of the hopper outlet 78. Whereas the venturi slide 75 can be adjusted to different positions to effect different discharge air pressures and flow rates, the slide valve 76 is generally positioned in either the closed or open position, depending on whether the truck discharge system is intended to be inactive or operative.

Referring again to FIG. 1, upon arrival at the customer's plant, the truck discharge system is connected at 20 to the inlet conduit 80 of the plant conveyance system 22. As further illustrated at FIG. 6, conduit 80 interconnects with an in-plant conveyance system including blower 82, venturi 84 and conveyance line 86. As will be understood, operation of the blower 82 and its associated venturi 84 enables the subdivided material discharge by the truck to be sucked into the line 86. The latter discharges into a gas dissipating cage or hopper 88 which discharges, in turn, to a supply conveyance line including blower 90, venturi 92 and conveyance line 94. Operation of the blower 90 allows material falling from the cage 88 to be pushed through the line 94 to high capacity perforate storage containers or bags 96. In the operation of the foregoing plant conveyance system, the blower functions are facilitated by adjustable venturi slide valves 98 and 100 positioned, respectively, in the venturis 84 and 92, to provide a desired degree of control over fluid pressures and flow rates within the conveyance lines 86 and 94. In general, the construction and mounting of the venturi slides 98 and 100 is similar to that previously described with respect to the venturi slide 75 employed in the truck discharge system 18.

FIGS. 6 through 8 illustrates one suitable embodiment of the storage bags or containers 96. In general, these bags can be fabricated of plastic material in an open mesh construction which facilitate dissipation of the entering conveyance gases. At their upper ends, the bags are supported from the overhead structure or ceiling by a series of hangers 97 interconnected with one or more flat support plates 99, which also serve as supports for an inverted "U" shaped duct 101 forming an outlet or discharge end of the supply conveyor 94. The inverted U shape of the duct 101 allows material to be blown the length of the bag without tendency toward clogging of the conveyor inlet, thus facilitating uniform distribution of the subdivided material within the bag. The material of the bags 96 is preferably gathered at a lower region 102 to simulate an elongated discharge trough, which can communicate with a series of flex-hose outlets 104, 106 and 108. Each of the flex-hose outlets communicates in turn with a distribution conveyor system including a blower 110, a collector conduit 112 and a distribution conduit 114 leading to various remote distribution outlets (not shown).

To facilitate progressive discharge of the storage bags 96, each of the flex-hose outlets is adapted to flow into a subadjacent venturi 116 through a normally closed slide valve 118. Each venturi 116 is provided, in turn, with an adjustable venturi slide 120 similar to the ones previously described. Again, the function of the venturi slide is to adjust the fluid pressure within the venturi and thereby the flow rate of material being discharged through a particular flex-hose outlet into the collector conduit 112. Thus, in the static position shown in FIG. 6, all of the slide valves 118 are in a fully inserted (closed) position, whereas the venturi slides 120 are in a fully retracted (inoperative) position. In such state, the blower 110 is free to discharge air through the conveyance lines 112, 114 without effect on the subdivided materials collected and stored in the storage bag 96. When demand for the sorted material makes it desirable to discharge the contents of the bag 96 through the distribution conduit 114, a first operational stage is to insert the venturi slide 120 for a particular venturi 116, say, for the flex-hose outlet 108, while at the same time retracting the closure 118. The effect is to rapidly discharge material from the left hand end of the bag 96 through the flex-hose outlet 108, through cooperative action of the blower 110 and subadjacent venturi 116. More specifically, insertion of the venturi slide 120 creates a low pressure zone beneath the outlet 108 which causes material to be drawn into the collector conduit 112 and to be impelled through the distributor conduit 114 to the desired point of use (e.g., a remote packaging operation). This phase of the bag discharge operation is represented in FIG. 8.

Upon diminishing the contents of the bag above the outlet 108, for example, from the dotted line level 122 to level 124, the discharge operation of the flex-hose outlet 108 can be terminated by withdrawing the venturi slide 120 and reinserting the closure slide 118. The intermediate flex-hose outlet 106 is next put in to operation by inserting its associated venturi slide 120 and retracting the closure slide 118 (see FIG. 9). This causes the material to be sucked through the flex-hose outlet 106 into the collector conduit 112 and pushed through the conduit 114 in the manner previously described. In this operational stage the contents in the middle of the storage bag are discharged and diminished, as represented by the fall of material to the dotted line 126. When the bag level 126 has been reached, the intermediate outlet 106 is deactivated by withdrawing its associated venturi slide 120 and reinserting the closure slide 118, following which the right hand flex-hose outlet 104 can be activated by inserting its associated venturi slide 120 and withdrawing the closure slide 118. In this way, the entire contents of the storage bag 96 can be progressively discharged into the collector conduit 112 for distribution to various remote plant outlets through the distribution conduit 114. In general, the described arrangement permits rapid filling and emptying of the storage bags 96 without clogging or jamming at either the inlet duct 101 or the outlet ducts 104, 106 or 108.

The overall operation of the foregoing system for vehicular transport and pneumatic conveyance of lightweight subdivided materials can now be described. Assuming a plant packaging facility or plant operation of the type described, the inlet blower or blowers 90, 82, are placed in operation to create suction in inlet lines 80 and 86. A vehicular transport unit 10 can now approach the inlet suction nozzle 20 and a connection can be made between the truck discharge system 18 and the plant conveyance system 22. The truck mounted blower unit 40 is next placed in operation, and the truck discharge line readied by insertion of the venturi slide 74 means of said vehicular means, venturi means positioned in said supply conduit means, blower means associated with said venturi means to effect delivery of said lightweight subdivided material from said vehicular discharge conduit means to said relatively large storage container, said U-shaped duct means forming a terminal portion of the supply conduit means of said stationary conveyance means within said relatively large volume storage container, a plurality of storage container discharge means arranged adjacent and in spaced relation to a discharge zone in said relatively large storage container, and selectively operable slide means in each of said storage container discharge means to effect a rapid and progressive discharge of the contents of said storage container for conveyance to one or more preselected distribution outlets provided at various locations in said stationary conveyance means.

2. In a system for vehicular transport and pneumatic conveyance of light weight subdivided materials from a source of supply to a point of end use, vehicular means including a relatively large enclosed transport body having inner and outer ends, first blower means carried by said transport body, flexible air blanket conveyance means on a bottom surface of said transport body, said first blower means introducing conveyance air under pressure to a hollow interior of said air blanket means, said air blanket means being additionally provided with directional discharge means on an upper surface thereof to effect progressive discharge of lightweight subdivided materials outwardly from said inner end of the transport body, discharge hopper means at the outer end of said transport body to receive light weight subdivided materials discharged by said air blanket means, venturi means in a bottom outlet of said hopper, discharge conduit means in fluid communication with said venturi means, and second blower means for effecting discharge of material from said discharge hopper, stationary conveyance means for light weight subdivided materials including a relatively large volume storage container for said light weight subdivided material, supply conduit means adapted to interconnect in fluid communication with the discharge conduit means of said vehicular means, venturi means positioned in said supply conduit means, additional blower means associated with said last named venturi means to supplement the operation of said vehicular discharge blower means in delivering light weight subdivided material to said relatively large storage container, and a plurality of storage container discharge means arranged adjacent and in spaced relation to a discharge zone in said relatively large storage container, and selectively operable slide means in each of said storage container discharge means to effect a rapid and progressive discharge of the contents of said storage container for conveyance to one or more preselected distribution outlets provided at various locations in said stationary conveyance means.

3. A system as in claim 2 wherein said relatively large storage container is in the form of a large flexible perforated bag and an inverted U-shaped duct means is positioned adjacent to the top thereof, said U-shaped duct means forming a terminal portion of the supply conduit means of said stationary conveyance means.

4. A system as in claim 2 wherein each of said storage container discharge means is in fluid communication with distribution conduit means leading from said storage container to said distribution outlets and each of said selectively operable slide means includes, in combination, selectively operable shutoff valve means to interrupt the flow of subdivided material to said distribution conduit means and selectively operable venturi slide means to selectively reduce the cross section of said distribution conduit means immediately adjacent said shutoff slide valve means, and discharge blower means for supplying conveyance air to said distribution conduit means to selectively withdraw subdivided material from said storage container through at least one of said storage container discharge means.

* * * * *